United States Patent
Zhang et al.

(10) Patent No.: US 10,553,242 B2
(45) Date of Patent: Feb. 4, 2020

(54) HEAT-ASSISTED MAGNETIC RECORDING MEDIUM AND MAGNETIC STORAGE APPARATUS

(71) Applicant: SHOWA DENKO K.K., Tokyo (JP)

(72) Inventors: Lei Zhang, Chiba (JP); Takayuki Fukushima, Chiba (JP); Chen Xu, Chiba (JP); Kazuya Niwa, Chiba (JP); Hisato Shibata, Chiba (JP); Takehiro Yamaguchi, Chiba (JP); Tetsuya Kanbe, Chiba (JP); Tomoo Shige, Chiba (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

(21) Appl. No.: 16/445,801

(22) Filed: Jun. 19, 2019

(65) Prior Publication Data
US 2020/0005821 A1   Jan. 2, 2020

(30) Foreign Application Priority Data

Jun. 29, 2018   (JP) .................................. 2018-124049

(51) Int. Cl.
*G11B 5/65*   (2006.01)
*G11B 5/00*   (2006.01)

(52) U.S. Cl.
CPC ...... *G11B 5/653* (2013.01); *G11B 2005/0021* (2013.01)

(58) Field of Classification Search
CPC ...................................................... G11B 5/65
USPC ........................................................ 360/135
See application file for complete search history.

(56) References Cited

U.S. PATENT DOCUMENTS

| | | | |
|---|---|---|---|
| 8,268,461 B1 * | 9/2012 | Hellwig | G11B 5/7325 428/831 |
| 2010/0110577 A1 | 5/2010 | Weller et al. | |
| 2012/0147718 A1 * | 6/2012 | Hellwig | G11B 5/66 369/13.33 |
| 2015/0016236 A1 * | 1/2015 | Sakawaki | G11B 5/746 369/13.24 |

(Continued)

OTHER PUBLICATIONS

Chuan-Bing Rong et al., Size-Dependent Chemical and Magnetic Ordering in L10-FePt Nanoparticles, Advanced Materials, 2006, 18, pp. 2984-2988.

*Primary Examiner* — Allen T Cao
(74) *Attorney, Agent, or Firm* — Ipusa, PLLC

(57) ABSTRACT

A heat-assisted magnetic recording medium includes: a substrate; an underlayer; and a magnetic layer that is (001)-oriented. In the magnetic layer, a first magnetic layer and a second magnetic layer are stacked in this order from the underlayer side. The first magnetic layer and the second magnetic layer include an alloy having an $L1_0$ structure. The second magnetic layer includes a ferrite at grain boundaries of magnetic grains. The ferrite is one or more kinds selected from the group consisting of $NiFe_2O_4$, $MgFe_2O_4$, $MnFe_2O_4$, $CuFe_2O_4$, $ZnFe_2O_3$, $CoFe_2O_4$, $BaFe_2O_4$, $SrFe_2O_4$, and $Fe_3O_4$. A Curie temperature of the magnetic grains is lower than a Curie temperature of the ferrite.

6 Claims, 2 Drawing Sheets

(56) References Cited

U.S. PATENT DOCUMENTS

| | | | |
|---|---|---|---|
| 2015/0093598 A1* | 4/2015 | Kubota | G11B 5/73 428/831.2 |
| 2015/0302878 A1* | 10/2015 | Beaujour | G11B 5/73 369/13.33 |
| 2016/0217816 A1* | 7/2016 | Sayama | G11B 5/65 |

* cited by examiner

HEAT-ASSISTED MAGNETIC RECORDING MEDIUM AND MAGNETIC STORAGE APPARATUS

CROSS-REFERENCE TO RELATED APPLICATIONS

This application is based on and claims priority to Japanese Patent Application No. 2018-124049 filed on Jun. 29, 2018, the entire contents of which are incorporated herein by reference.

BACKGROUND OF THE INVENTION

1. Field of the Invention

The disclosures herein generally relate to a heat-assisted magnetic recording medium and a magnetic storage apparatus.

2. Description of the Related Art

A heat-assisted recording method, by which a surface is locally heated by irradiating a magnetic recording medium with near-field light or the like such that writing on the magnetic recording medium is performed by reducing the magnetic coercivity of the magnetic recording medium, is known as a next-generation recording method that can realize an areal recording density of approximately 1 Tbit/inch$^2$. Using the heat-assisted recording method, it is possible to easily write on a magnetic recording medium having a coercivity of several tens of kOe at ambient temperature by the recording magnetic field of a magnetic head. Therefore, a high Ku material whose crystal magnetic anisotropic constant Ku is on the order of $10^6$ J/m$^3$ can be used for a magnetic layer. As a result, while maintaining the thermal stability of the magnetic layer, the grain size of magnetic grains can be reduced to 6 nm or less. As high Ku materials, alloys such as FePt alloys (Ku≈7×10$^6$ J/m$^3$) having an L1$_0$ structure and CoPt alloys (Ku≈5×10$^6$ J/m$^3$) are known.

In order to enhance the areal recording density of a heat-assisted magnetic recording medium, it is necessary to enhance the electromagnetic conversion characteristics of the heat-assisted magnetic recording medium by enhancing the crystal orientation of the magnetic layer, making the magnetic grains finer, and reducing exchange coupling between the magnetic grains.

However, when magnetic grains are made finer, the crystallinity of the magnetic grains decreases. As a result, the Curie temperature of the magnetic grains decreases and the variance of Curie temperature of the magnetic grains increases. Therefore, the electromagnetic conversion characteristics of a heat-assisted magnetic recording medium decrease (see, e.g., Non-Patent Document 1).

Patent Document 1 describes a thin film structure including a plurality of grains of a first magnetic material having a first Curie temperature embedded in a matrix of a second material having a second Curie temperature. Here, the second Curie temperature is lower than the first Curie temperature, and the second material includes one or more of an oxide, a sulfide, a nitride and a boride.

RELATED-ART DOCUMENTS

Patent Documents

[Patent Document 1] U.S Laid-Open Patent Publication No. 2010/0110577

Non-Patent Documents

[Non-patent Document 1] ADVANCED MATERIALS, 2006, 18, 2984-2988

However, it is desired to further enhance the areal recording density of a heat-assisted magnetic recording medium. That is, it is desired to further enhance the electromagnetic conversion characteristics of the heat-assisted magnetic recording medium.

It is an object of one aspect of the present invention to provide a heat-assisted magnetic recording medium having excellent electromagnetic conversion characteristics.

SUMMARY OF THE INVENTION (1) A heat-assisted magnetic recording medium includes: a substrate; an underlayer; and a magnetic layer that is (001)-oriented. In the magnetic layer, a first magnetic layer and a second magnetic layer are stacked in this order from the underlayer side. The first magnetic layer and the second magnetic layer include an alloy having an L1$_0$ structure. The second magnetic layer includes a ferrite at grain boundaries of magnetic grains. The ferrite is one or more kinds selected from the group consisting of NiFe$_2$O$_4$, MgFe$_2$O$_4$, MnFe$_2$O$_4$, CuFe$_2$O$_4$, ZnFe$_2$O$_3$, CoFe$_2$O$_4$, BaFe$_2$O$_4$, SrFe$_2$O$_4$, and Fe$_3$O$_4$. A Curie temperature of the magnetic grains is lower than a Curie temperature of the ferrite.

(2) The heat-assisted magnetic recording medium according to (1), wherein the first magnetic layer has a thickness in a range of 0.3 nm to 5.0 nm, and wherein the second magnetic layer has a thickness in a range of 1.0 nm to 10.0 nm.

(3) The heat-assisted magnetic recording medium according to (1), wherein the second magnetic layer further includes, at the grain boundaries of the magnetic grains, a substance selected from the group consisting of C, SiC, VC, B$_4$C, Si$_3$N$_4$, VN, BN, TiN, and AlN.

(4) The heat-assisted magnetic recording medium according to (1), wherein in the second magnetic layer, a content of the ferrite is in a range of 0.5% by volume to 60% by volume.

(5) The heat-assisted magnetic recording medium according to (1), wherein the alloy having the L1$_0$ structure is a Fe—Pt alloy or a Co—Pt alloy.

(6) A magnetic storage apparatus includes: the heat-assisted magnetic recording medium according to (1).

According to one aspect of the present invention, it is possible to provide a heat-assisted magnetic recording medium having excellent electromagnetic conversion characteristics.

DESCRIPTION OF THE PREFERRED EMBODIMENTS

Figure 1:
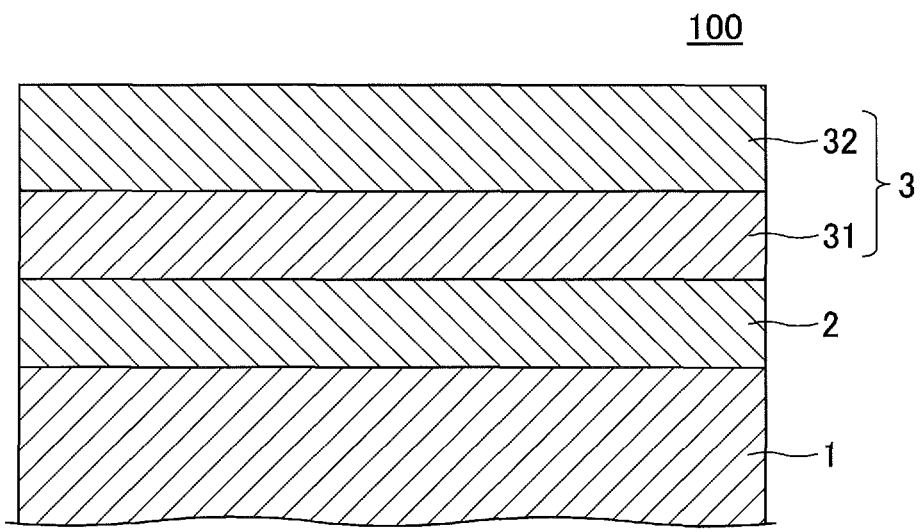
FIG. 1 is a cross-sectional view illustrating an example of a layer structure of a heat-assisted magnetic recording medium according to an embodiment.

In the following, an embodiment of the present invention will be described with reference to the accompanying drawings. Note that in the drawings used in the following description, portions that are features may be enlarged in order to make the features easy to understand for convenience, and the dimensional ratios of respective components may not be the same as in the drawings.

(Heat-Assisted Magnetic Recording Medium)

FIG. 1 illustrates an example of a layer structure of a heat-assisted magnetic recording medium 100 according to an embodiment.

The heat-assisted magnetic recording medium 100 includes a substrate 1, an underlayer 2, and a magnetic layer 3 that is (001)-oriented. Here, in the magnetic layer 3, a first magnetic layer 31 and a second magnetic layer 32 are stacked in this order. Also, the first magnetic layer 31 and the second magnetic layer 32 include an alloy having an $L1_0$ structure, and the second magnetic layer 32 includes a ferrite at the grain boundaries of magnetic grains. The ferrite, which is included in the second magnetic layer 32, is one or more kinds selected from the group consisting of $NiFe_2O_4$, $MgFe_2O_4$, $MnFe_2O_4$, $CuFe_2O_4$, $ZnFe_2O_3$, $CoFe_2O_4$, $BaFe_2O_4$, $SrFe_2O_4$, and $Fe_3O_4$. The Curie temperature of the magnetic grains included in the second magnetic layer 32 is lower than the Curie temperature of the ferrite included in the second magnetic layer 32.

By having the above-described structure in the heat-assisted magnetic recording medium 100, even when the grain diameters of the magnetic grains constituting the magnetic layer 3 are made 6 nm or less, the electromagnetic conversion characteristics of the heat-assisted magnetic recording medium 100 can be maintained at a high level.

Here, the difference between the Curie temperature of the ferrite and the Curie temperature of the magnetic grains is preferably 50° C. or more and is more preferably 100° C. or more.

Next, the reason why the electromagnetic conversion characteristics of the heat-assisted magnetic recording medium 100 are enhanced will be described.

Generally, when the grain diameters of magnetic grains constituting a magnetic layer are made 6 nm or less, the crystallinity of the magnetic grains decreases. As a result, the Curie temperature of the magnetic grains decreases and the variance of Curie temperature of the magnetic grains increases. Therefore, the electromagnetic conversion characteristics of the heat-assisted magnetic recording medium decrease.

Thus, because the heat-assisted magnetic recording medium 100 includes, at the grain boundaries of the magnetic grains constituting the second magnetic layer 32, a ferrite having a higher Curie temperature than that of the magnetic grains, the magnetic grains and the ferrite are exchange-coupled. Thereby, the apparent Curie temperature of the magnetic grains is enhanced and the variance of the Curie temperature is reduced. Also, because the grain boundaries including the ferrite are also magnetic, the apparent magnetic grain diameters of the magnetic grains constituting the second magnetic layer 32 are increased. From the above, it is considered that the electromagnetic conversion characteristics of the heat-assisted magnetic recording medium 100 are enhanced.

Although the ferrite, included at the grain boundaries of the magnetic grains constituting the second magnetic layer 32, is one or more kinds selected from the group consisting of $NiFe_2O_4$, $MgFe_2O_4$, $MnFe_2O_4$, $CuFe_2O_4$, $ZnFe_2O_3$, $CoFe_2O_4$, $BaFe_2O_4$, $SrFe_2O_4$, and $Fe_3O_4$, the ferrite is preferably one or more kinds selected from the group consisting of $NiFe_2O_4$, $MgFe_2O_4$, $CoFe_2O_4$, $CuFe_2O_4$, $ZnFe_2O_3$, and $SrFe_2O_4$. Thereby, in addition to exchange coupling with the magnetic grains, the magnetic grains can be made finer.

The content of the ferrite in the second magnetic layer 32 is preferably in a range of 0.5% by volume to 60% by volume, and is more preferably in a range of 10% by volume to 40% by volume. When the content of the ferrite in the second magnetic layer 32 is greater than or equal to 0.5% by volume, the apparent Curie temperature of the magnetic grains is further enhanced, and when the content of the ferrite in the second magnetic layer 32 is less than or equal to 60% by volume, the magnetic grains and the ferrite are further easily exchange-coupled.

The thickness of the second magnetic layer 32 is preferably in a range of 1.0 nm to 10.0 nm, and is more preferably in a range of 3.0 nm to 7.0 nm. When the thickness of the second magnetic layer 32 is 1.0 nm or more, the electromagnetic conversion characteristics of the heat-assisted magnetic recording medium 100 are further enhanced, and when the thickness of the second magnetic layer 32 is 10.0 nm or less, the (001) orientation of the second magnetic layer 32 is further enhanced.

Also, because the first magnetic layer 31 includes an alloy having an $L1_0$ structure, the (001) orientation of the second magnetic layer 32 is enhanced.

Here, it is preferable that the first magnetic layer 31 does not include a ferrite. Thereby, the (001) orientation of the second magnetic layer 32 is further enhanced.

The thickness of the first magnetic layer 31 is preferably in a range of 0.3 nm to 5.0 nm, and is more preferably in a range of 0.5 nm to 3.0 nm. When the thickness of the first magnetic layer 31 is 0.3 nm or more, the (001) orientation of the second magnetic layer 32 is further enhanced, and when the thickness of the first magnetic layer 31 is 5.0 nm or less, the electromagnetic conversion characteristics of the heat-assisted magnetic recording medium 100 are further enhanced.

The alloy having an $L1_0$ structure included in the magnetic layer 3 is preferably a FePt magnetic alloy or a CoPt magnetic alloy.

The magnetic layer 3 preferably includes a grain boundary segregation material for magnetic grains. Thus, the magnetic layer 3 has a granular structure in which the magnetic grains having an $L1_0$ structure are divided by the grain boundary segregation material. As a result, in addition to making the magnetic grains finer, exchange coupling between the magnetic grains can be reduced.

As the grain boundary segregation material for magnetic grains, an oxide such as $SiO_2$, $TiO_2$, $Cr_2O_3$, $Al_2O_3$, $Ta_2O_5$, $ZrO_2$, $Y_2O_3$, $CeO_2$, $MnO$, $TiO$, or $ZnO$, $C$, a carbide such as VC, a nitride such as VN, BN, TiN, or the like may be used. Two or more of these may be used in combination as the grain boundary segregation material for magnetic grains.

It is preferable that the heat-assisted magnetic recording medium 100 further includes, at the grain boundaries of the magnetic grains constituting the second magnetic layer 32, a substance selected from the group consisting of C, SiC, VC, $B_4C$, $Si_3N_4$, VN, BN, TiN, and AlN. Because these substances do not easily react with a ferrite even at a high temperature, even when being mixed with the ferrite at the grain boundaries of the magnetic grains constituting the second magnetic layer 32, the magnetic grains can be further miniaturized and also exchange coupling between the magnetic grains can be further reduced.

The content of the above described substance in the second magnetic layer 32 is preferably in a range of 10% by volume to 50% by volume, and is more preferably in a range of 20% by volume to 40% by volume. When the content of the above described substance in the second magnetic layer 32 is 10% by volume or more, the electromagnetic conversion characteristics of the heat-assisted magnetic recording medium 100 are further enhanced, and when content of the above described substance in the second magnetic layer 32 is 50% by volume or less, the (001) orientation of the second magnetic layer 32 is further enhanced.

It is preferable that the underlayer 2 highly lattice-matches the magnetic layer 3. This further enhances the (001) orientation of the magnetic layer 3.

Examples of the underlayer 2 that highly lattice-matches the magnetic layer 3 include, for example, a Cr layer, a W layer, and a MgO layer that are (100)-oriented.

Also, the underlayer 2 may have a multi-layer structure.

A lattice misfit (or mismatch) among a plurality of layers of the underlayer 2 having the multi-layer structure is preferably 10% or less.

The underlayer 2 having the multi-layer structure whose lattice misfit is 10% or less may be an underlayer in which a Cr layer, a W layer, and a MgO layer having a (100) orientation are stacked, for example.

Also, in order to enhance the (100) orientation of the underlayer 2, a Cr layer or a Cr alloy layer having a bcc structure or an alloy layer having a B2 structure may be further formed between the substrate 1 and the underlayer 2.

Examples of such a Cr alloy include, for example, a Cr—Mn alloy, a Cr—Mo alloy, a Cr—W alloy, a Cr—V alloy, a Cr—Ti alloy, a Cr—Ru alloy, and the like.

Examples of the alloy having the B2 structure include a RuAl alloy, a NiAl alloy, and the like.

Also, an oxide may be added to the underlayer 2 to enhance the lattice matching with the magnetic layer 3.

Examples of the oxide include, for example, oxides of one or more kinds of metal selected from the group consisting of Cr, Mo, Nb, Ta, V, and W. In particular, $CrO$, $Cr_2O_3$, $CrO_3$, $MoO_2$, $MoO_3$, $Nb_2O_5$, $Ta_2O_5$, $V_2O_3$, $VO_2$, $WO_2$, $WO_3$, and $WO_6$ are preferable.

The content of oxide in the underlayer 2 is preferably in a range of 2 mol % to 30 mol %, and is more preferably in a range of 10 mol % to 25 mol %. The (001) orientation of the magnetic layer 3 is further enhanced when the content of oxide in the underlayer 2 is 2 mol % or more. The (100) orientation of the underlayer 2 is further enhanced when the content of oxide in the underlayer 2 is 30 mol % or less.

It is preferable that a protective layer is formed on the magnetic layer 3 in the heat-assisted magnetic recording medium 100.

A method of forming the protective layer is not limited to a particular method. For example, a RF-CVD (Radio Frequency-Chemical Vapor Deposition) method that decomposes a source gas made of hydrocarbon by high-frequency plasma, an IBD (Ion Beam Deposition) method that ionizes a source gas by electrons emitted from a filament, a FCVA (Filtered Cathodic Vacuum Arc) method that uses a solid carbon target without using a source gas, or the like may be used to form the protective layer.

The thickness of the protective layer is preferably 1 nm or more and 6 nm or less. The floating properties of the magnetic head become satisfactory when the thickness of the protective layer is 1 nm or more. Also, a magnetic spacing decreases and the SNR of the heat-assisted magnetic recording medium 100 is enhanced when the thickness of the protective layer is 6 nm or less.

In the heat-assisted magnetic recording medium 100, a lubricant layer including a perfluoropolyether-based lubricant may be further formed on the protective layer.

(Magnetic Storage Apparatus)

A magnetic storage apparatus according to the present embodiment is not limited to a particular structure, as long as the magnetic storage apparatus includes a heat-assisted magnetic recording medium according to the embodiment described above.

The magnetic storage apparatus according to the present embodiment includes, for example, a magnetic recording medium drive unit for rotating a heat-assisted magnetic recording medium, a magnetic head provided with a near field light generation element on its tip, a magnetic head drive unit for moving the magnetic head, and a recording and reproducing signal processing system.

Also, the magnetic head includes, for example, a laser light generation unit for heating the heat-assisted magnetic recording medium, and a waveguide for guiding laser light generated from the laser light generation unit to the near field light generation element.

Figure 2:
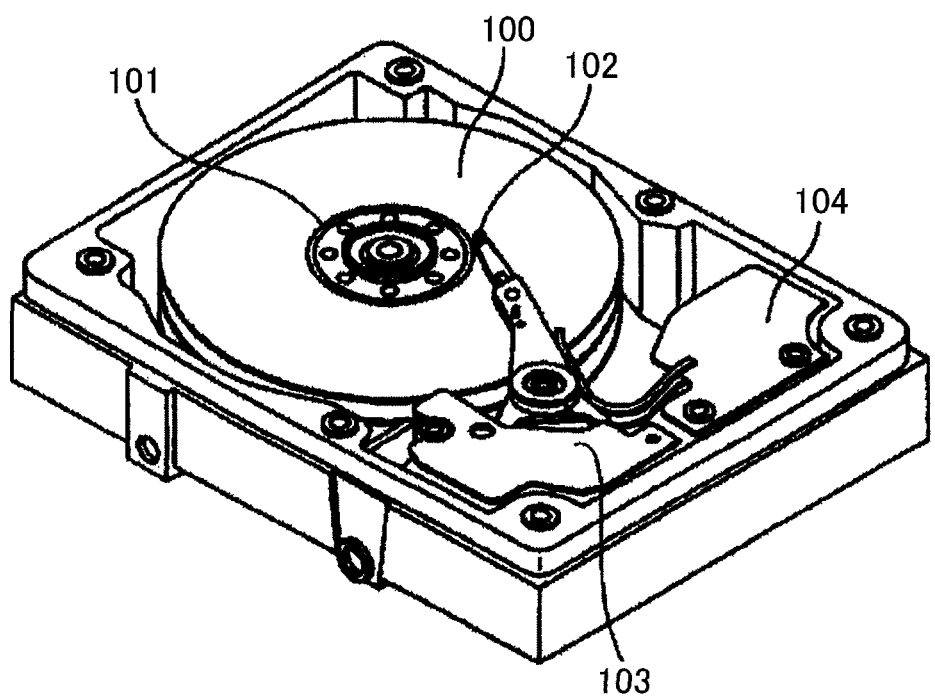
FIG. 2 is a perspective view illustrating an example of a magnetic storage apparatus according to the embodiment.

FIG. 2 illustrates an example of a magnetic storage apparatus according to the present embodiment.

The magnetic storage apparatus illustrated in FIG. 2 includes a heat-assisted magnetic recording medium 100, a magnetic recording medium drive unit 101 for rotating the heat-assisted magnetic recording medium 100, a magnetic head 102, a magnetic head drive unit 103 for moving the magnetic head 102, and a recording and reproducing signal processing system 104.

Figure 3:
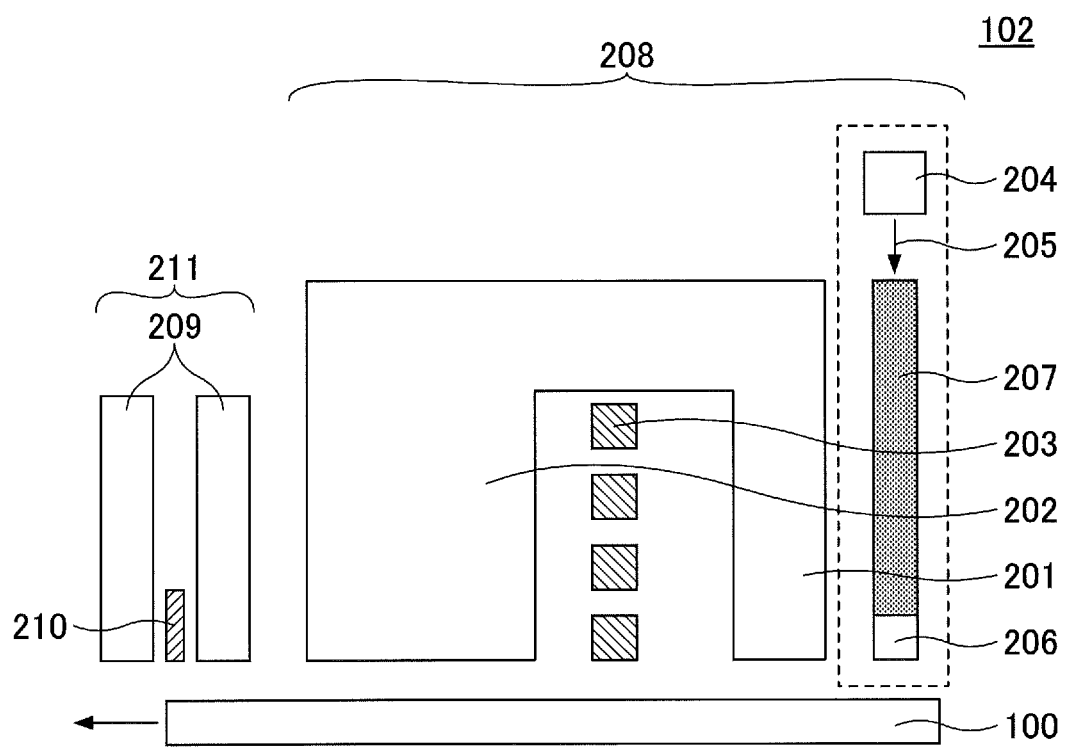
FIG. 3 is a schematic diagram illustrating an example of a magnetic head used in the magnetic storage apparatus of FIG. 2.

FIG. 3 illustrates an example of the magnetic head 102.

The magnetic head 102 includes a recording head 208 and a reproducing head 211.

The recording head 208 includes a main magnetic pole 201, an auxiliary magnetic pole 202, a coil 203 for generating a magnetic field, a laser diode (LD) 204, which serves as a laser light generation unit, and a waveguide 207 for transmitting laser light 205 generated at the LD 204 to a near field light generation element 206.

The reproducing head 211 includes a reproducing element 210 sandwiched by shields 209.

EXAMPLES

In the following, Examples of the present invention will be described. Note that the present invention is not limited to Examples described below, and various variations and modifications may be made without departing from the scope of the present invention.

Examples 1-1 to 1-8 and Comparative Example 1-1

On a heat-resistant glass substrate, an alloy layer (underlayer) of Cr-50 at % Ti (in which the content of Cr is 50 at % and the content of Ti is 50 at %) having a thickness of 50 nm and an alloy layer (soft magnetic underlayer) of Co-20 at % Ta-5 at % B having a thickness of 25 nm were formed and heated to 250° C. Thereafter, a Cr layer (underlayer) having a thickness of 10 nm and a Mgo layer (underlayer) having a thickness of 10 nm were formed and then heated to 520° C. Thereafter, a first magnetic layer having a thickness of 0.5 nm and a second magnetic layer having a thickness of 6.0 nm were formed, and then a carbon layer (protective layer) having a thickness of 3 nm were formed. Finally, a perfluoropolyether-based lubricant was applied to the protective layer to form a lubricant layer to obtain a heat-assisted magnetic recording medium.

Here, the materials constituting the first magnetic layers and the second magnetic layers are indicated in Table 1.

For example, (Fe-55 at % Pt)-20 vol % C-20 vol % $CoFe_2O_4$ means that the content of Fe—Pt alloy, in which the content of Fe is 45 at % and the content of Pt is 55 at %, is 60% by volume, the content of C is 20% by volume, and the content of $CoFe_2O_4$ is 20% by volume.

(Electromagnetic Conversion Characteristics)

After incorporating the heat-assisted magnetic recording medium into a magnetic storage apparatus as illustrated in FIG. 2, the heat-assisted magnetic recording medium was heated using a magnetic head as illustrated in FIG. 3, a signal of liner recording density 1600 kFCI (kilo Flux changes per inch) was recorded, and the SN ratio (SNR) was measured.

Table 1 indicates the measurement results of the electromagnetic conversion characteristics of the heat-assisted magnetic recording mediums.

magnetic layer does not contain ferrite, the electromagnetic conversion characteristics are low.

Examples 2-1 to 2-9 and Comparative Examples 2-1 and 2-2

With the exceptions that the thickness of the first magnetic layers was changed to 1.0 nm and the materials constituting the first magnetic layers and the second magnetic layers were changed (see Table 2), heat-assisted magnetic recording mediums of Examples 2-1 to 2-9 and Comparative Examples 2-1 and 2-2 were obtained in a manner similar to that in Examples 1-1 to 1-8 and Comparative Example 1-1.

Table 2 indicates the measurement results of the electromagnetic conversion characteristics of the heat-assisted magnetic recording mediums.

TABLE 1

| | FIRST MAGNETIC LAYER | SECOND MAGNETIC LAYER | CURIE TEMPERATURE OF MAGNETIC GRAINS [K] | CURIE TEMPERATURE OF FERRITE [K] | SNR [dB] |
|---|---|---|---|---|---|
| E1-1 | Fe-55 at % Pt | (Fe-55 at % Pt)-20 vol % C-20 vol % $CoFe_2O_4$ | 670 | 793 | 13.5 |
| E1-2 | Fe-55 at % Pt | (Fe-55 at % Pt)-20 vol % BN-20 vol % $CoFe_2O_4$ | 670 | 793 | 13.8 |
| E1-3 | Fe-55 at % Pt | (Fe-55 at % Pt)-20 vol % $B_4C$-20 vol % $CoFe_2O_4$ | 670 | 793 | 13.4 |
| E1-4 | Fe-55 at % Pt | (Fe-55 at % Pt)-20 vol % SiC-20 vol % $CoFe_2O_4$ | 670 | 793 | 13.5 |
| E1-5 | Fe-55 at % Pt | (Fe-55 at % Pt)-20 vol % $Si_3N_4$-20 vol % $CoFe_2O_4$ | 670 | 793 | 13.5 |
| E1-6 | Fe-55 at % Pt | (Fe-55 at % Pt)-20 vol % AlN-20 vol % $CoFe_2O_4$ | 670 | 793 | 13.6 |
| E1-7 | Fe-55 at % Pt | (Fe-55 at % Pt)-20 vol % ZrN-20 vol % $CoFe_2O_4$ | 670 | 793 | 13.7 |
| E1-8 | Fe-55 at % Pt | (Fe-55 at % Pt)-20 vol % TaN-20 vol % $CoFe_2O_4$ | 670 | 793 | 13.3 |
| CE1-1 | Fe-55 at % Pt | (Fe-55 at % Pt)-20 vol % C-20 vol % $SiO_2$ | 670 | — | 12.0 |

From Table 1, it is apparent that, in the heat-assisted magnetic recording mediums of Examples 1-1 to 1-8, the electromagnetic conversion characteristics are high.

Conversely, in the heat-assisted magnetic recording medium of Comparative Example 1-1, because the second

TABLE 2

| | FIRST MAGNETIC LAYER | SECOND MAGNETIC LAYER | CURIE TEMPERATURE OF MAGNETIC GRAINS [K] | CURIE TEMPERATURE OF FERRITE [K] | SNR [dB] |
|---|---|---|---|---|---|
| E2-1 | (Fe-47.5 at % Pt-5 at % Rh)-40 vol % C | (Fe-47.5 at % Pt-5 at % Rh)-20 vol % BN-20 vol % $NiFe_2O_4$ | 550 | 858 | 15.1 |
| E2-2 | (Fe-47.5 at % Pt-5 at % Rh)-40 vol % C | (Fe-47.5 at % Pt-5 at % Rh)-20 vol % BN-20 vol % $CuFe_2O_4$ | 550 | 728 | 15.3 |
| E2-3 | (Fe-47.5 at % Pt-5 at % Rh)-40 vol % C | (Fe-47.5 at % Pt-5 at % Rh)-20 vol % BN-20 vol % $ZnFe_2O_4$ | 550 | 800 | 16.0 |
| E2-4 | (Fe-47.5 at % Pt-5 at % Rh)-40 vol % C | (Fe-47.5 at % Pt-5 at % Rh)-20 vol % BN-20 vol % $MnFe_2O_4$ | 550 | 573 | 13.5 |
| E2-5 | (Fe-47.5 at % Pt-5 at % Rh)-40 vol % C | (Fe-47.5 at % Pt-5 at % Rh)-20 vol % BN-20 vol % $CoFe_2O_4$ | 550 | 790 | 15.6 |
| E2-6 | (Fe-47.5 at % Pt-5 at % Rh)-40 vol % C | (Fe-47.5 at % Pt-5 at % Rh)-20 vol % BN-20 vol % $SrFe_2O_4$ | 550 | 720 | 15.8 |
| E2-7 | (Fe-47.5 at % Pt-5 at % Rh)-40 vol % C | (Fe-47.5 at % Pt-5 at % Rh)-30 vol % BN-10 vol % $CoFe_2O_4$ | 550 | 790 | 14.3 |
| E2-8 | (Fe-47.5 at % Pt-5 at % Rh)-40 vol % C | (Fe-47.5 at % Pt-5 at % Rh)-10 vol % BN-30 vol % $CoFe_2O_4$ | 550 | 790 | 15.0 |
| E2-9 | (Fe-47.5 at % Pt-5 at % Rh)-40 vol % C | (Fe-47.5 at % Pt-5 at % Rh)-40 vol % $CoFe_2O_4$ | 550 | 790 | 13.1 |
| CE2-1 | (Fe-47.5 at % Pt-5 at % Rh)-40 vol % C | (Fe-47.5 at % Pt-5 at % Rh)-20 vol % BN-20 vol % $SiO_2$ | 550 | — | 13.0 |
| CE2-2 | (Fe-47.5 at % Pt-5 at % Rh)-40 vol % C | (Fe-47.5 at % Pt-5 at % Rh)-40 vol % $SiO_2$ | 550 | — | 12.0 |

From Table 1, it is apparent that, in the heat-assisted magnetic recording mediums of Examples 2-1 to 2-9, the electromagnetic conversion characteristics are high.

Conversely, in the heat-assisted magnetic recording medium of Comparative Examples 2-1 and 2-2, because the second magnetic layers do not contain ferrite, the electromagnetic conversion characteristics are low.

What is claimed is:

1. A heat-assisted magnetic recording medium comprising:
   a substrate;
   an underlayer; and
   a magnetic layer that is (001)-oriented,
   wherein in the magnetic layer, a first magnetic layer and a second magnetic layer are stacked in this order from the underlayer side,
   wherein the first magnetic layer and the second magnetic layer include an alloy having an $L1_0$ structure,
   wherein the second magnetic layer includes a ferrite at grain boundaries of magnetic grains,
   wherein the ferrite is one or more kinds selected from the group consisting of $NiFe_2O_4$, $MgFe_2O_4$, $MnFe_2O_4$, $CuFe_2O_4$, $ZnFe_2O_3$, $CoFe_2O_4$, $BaFe_2O_4$, $SrFe_2O_4$, and $Fe_3O_4$, and
   wherein a Curie temperature of the magnetic grains is lower than a Curie temperature of the ferrite.

2. The heat-assisted magnetic recording medium according to claim 1,
   wherein the first magnetic layer has a thickness in a range of 0.3 nm to 5.0 nm, and
   wherein the second magnetic layer has a thickness in a range of 1.0 nm to 10.0 nm.

3. The heat-assisted magnetic recording medium according to claim 1, wherein the second magnetic layer further includes, at the grain boundaries of the magnetic grains, a substance selected from the group consisting of C, SiC, VC, $B_4C$, $Si_3N_4$, VN, BN, TiN, and AlN.

4. The heat-assisted magnetic recording medium according to claim 1, wherein in the second magnetic layer, a content of the ferrite is in a range of 0.5% by volume to 60% by volume.

5. The heat-assisted magnetic recording medium according to claim 1, wherein the alloy having the $L1_0$ structure is a Fe—Pt alloy or a Co—Pt alloy.

6. A magnetic storage apparatus comprising:
   the heat-assisted magnetic recording medium according to claim 1.

* * * * *